United States Patent
Shaffer et al.

(10) Patent No.: US 6,236,676 B1
(45) Date of Patent: May 22, 2001

(54) INTELLIGENT ADAPTIVE MODULATION SYSTEM

(75) Inventors: Shmuel Shaffer, Palo Alto; William Joseph Beyda, Cupertino, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/062,473

(22) Filed: Apr. 17, 1998

(51) Int. Cl.$^7$ .................................................. H04B 1/38
(52) U.S. Cl. .................. 375/222; 375/219; 375/220; 375/223; 379/93.31
(58) Field of Search ...................................... 375/222, 220, 375/219, 223, 261, 377; 379/93.29, 93.31, 93.32, 93.33, 93.34, 93.08, 100.17

(56) References Cited

U.S. PATENT DOCUMENTS

| | | |
|---|---|---|
| 4,931,250 | 6/1990 | Greszczuk . |
| 5,202,899 | 4/1993 | Walsh . |
| 5,367,563 * | 11/1994 | Sainton ................................... 379/98 |
| 5,550,881 | 8/1996 | Sridhar et al. . |
| 5,577,087 * | 11/1996 | Furuya ................................. 375/377 |
| 6,021,183 * | 1/2000 | Yoshida .............................. 379/93.08 |
| 6,031,867 * | 2/2000 | Johnson et al. ...................... 375/222 |

\* cited by examiner

*Primary Examiner*—Stephen Chin
*Assistant Examiner*—Shuwang Liu

(57) ABSTRACT

A system and apparatus for enabling modems having incompatible modulation methods to communicate with one another. The adaptive modulation system is adapted to enable a first communications device having a first modulation method to communicate with a second communications device having a second modulation method, even in those instances where the modulation methods are incompatible. The adaptive modulation system includes a communications device having a controller, a data pump and a data access arrangement/coder/decoder. The controller further includes an adaptive modulation unit having a decoder/interpreter, and a programmer. The decoder/interpreter in the adaptive modulation unit in the first communications device receives an incompatible modulation mode algorithm from the second communications device. The programmer receives the decoded modulation algorithm and programs the flash ROM with the new modulation method. A comparator may also be used to determine whether transfer of the algorithm is time efficient.

22 Claims, 6 Drawing Sheets

INTELLIGENT ADAPTIVE MODULATION SYSTEM

BACKGROUND OF THE INVENTION

1. Field of the Invention

The present invention generally relates to a modem system and, more particularly to an adaptive modem modulation system for enabling modems having incompatible modulation methods to communicate with one another.

2. Description of the Prior Art

It is well known that modern telecommunications devices, such as modems, enable transmission of data over communications channels, such as a telephone network, by accessing a network or another modem via a switched data connection through the public switched telephone network (PSTN) or through an Integrated Services Digital Network (ISDN) connection. Modems have the ability to communicate with other modems at a variety of speeds using a number of well-known international standards, generally promulgated by the International Telecommunications Union (ITU). However, in order to connect, the modems must support the same modulation method or mode. Typically, modems connect at data rates selected from a number of maximum data rates, such as 33.6 Kbps, 28.8 Kbps, 14.4 Kbps, 2400 Kbps, 1200 Kbps, 300 Kbps, etc. The modulation mode used in enabling connections at one of the above rates is typically selected from a plurality of ITU standard modulation modes, such as V.34+, V.34, V.32/V.32 bis, V.22/V.22 bis, Bell212 and Bell 103, respectively. Other modulation modes are available as well.

In order to establish a switched data connection, a personal computer (PC) of the originating call includes data communications equipment, such as a modem, that is coupled to the PSTN. Generally, a command is entered into the PC to instruct the modem to dial a telephone number associated with the modem or network the user is attempting to access. After dialing and detecting an answer tone from a far end, or remote, modem of the facility being dialed, both the local modem and the remote modem perform a handshaking procedure to establish the data connection.

In particular, handshaking is performed by the modems each time a data connection is established between the two modems. During the handshaking or initializing procedure, each modem performs a training routine, wherein the modem evaluates the analog communications channel across which the data connection is established. During the training routine, a predetermined training signal is transmitted between the modems from which the modem calculates a set of operating parameters based on an evaluation of the test signal.

Typically, the method employed for selection of a particular modulation mode for transmission of data is the automode method described in U.S. Pat. No. 4,931,250, Greszczuk, which is hereby incorporated by reference. The automode method provides for selection of a common modulation mode negotiated between a call and an answer modem for transmission of data. This is done by automatically choosing the modulation mode to achieve the highest common data rate. Such a method is effective when modems having the same modulation mode are attempting to communicate with one another. For example, two V.34+ standard modems are able to connect and communicate with each other at rates up to 33.6 Kbps because each modem contains the appropriate standard modulation mode specified by the ITU.

However, in many cases, modem manufactures will also include proprietary modulation methods that increase data rates, but that are not approved or specified by the ITU. Such modems may only communicate with other modems having the same proprietary modulation method. Generally, such modulation methods are not compatible with modulation methods of other modem manufacturers that may also be developing their own proprietary modulation modes. Thus, modems that operate using the various proprietary modulation methods are unable to connect using the new modulation methods until a common standard is determined by the ITU.

For example, in 56 Kbps modem technology there exists two competing modulation methods that are incompatible. In particular, X2 modulation developed by U.S. Robotics/3com, and the K56Flex modulation developed by Motorola, are two such competing technologies that are incompatible. Accordingly, the X2 and the K56Flex modems can not communicate with each other at 56 Kbps but may do so at 33.6 Kbps because of the established v.34+ ITU standard. Thus, the higher 56 Kbps speed capabilities of the modem are wasted because of the requirement that the two modems communicate at the slower compatible speed. Because of such incompatibilities between the different modulation methods, many users hesitate and/or delay purchase of cutting-edge technology modems until the ITU specifies a standard at which all modems may intercommunicate at the higher data rate. ITU standardization is a lengthy process, however, and may often take one to two years before agreement on a standard is reached.

The wait-and-see attitude adopted by customers in such cases results in stagnation of market growth as users delay purchase of the product for fear that a modem having one type of new technology will prevent them from connecting to modems having a different type of new technology, thus wasting their investment. In addition, many users are reluctant to purchase a product with enhanced modulation modes when there are few other modems or service providers that will support such a particular enhanced mode to which the user may connect.

Therefore, what is needed is a system for enabling modems having incompatible modulation methods to communicate with each other using the higher data rates made possible by the new, non-standard modulation methods.

SUMMARY OF THE INVENTION

Briefly, the present invention relates to a system and apparatus for enabling modems having incompatible modulation methods to communicate with one another. The adaptive modulation system is adapted to enable communications devices, for example, a first modem having a first modulation method to communicate with a second modem having a second modulation method, even in those instances where the modulation methods are incompatible. Communication between incompatible modems is accomplished by enabling one of the modems to download the incompatible modulation method algorithm from the other modem and execute modulation using the newly downloaded modulation algorithm, thereby allowing both modems to communicate using the same mode and eliminating any incompatibility problems that may exist.

The adaptive modulation system includes a modem having a controller, a data pump and a data access arrangement/coder/decoder. The controller further includes an adaptive modulation unit having a decoder/interpreter, a comparator, and a programmer. Therefore, in a particular embodiment of the invention, when two modems having one or more incompatible modulation modes connect to one another, they will connect at the highest ITU compliant compatible speed. The modems will then determine which of the modulation modes is better, i.e. faster, and whether the modem that is to receive the modulation method from the other modem has enough processing power to operate using the modulation method contemplated. The modulation mode algorithm is then sent from the first modem to the second modem. The decoder/interpreter in the AMU in the first modem decodes the received incompatible modulation mode algorithm and the programmer programs the flash ROM with the new modulation method. The modems may then communicate using the new algorithm. A comparator may also be used to determine whether transfer of the algorithm is time efficient.

DETAILED DESCRIPTION OF THE INVENTION

The present invention relates to a system for enabling several communications devices, such as two modems, having incompatible modulation modes to communicate with one another. Communication using incompatible modulation modes is achieved by enabling the first modems to execute the modulation mode found in the second modem such that each modem is modulating using the same algorithm. Each modem, although having one or more incompatible modulation methods, also has one or more compatible, ITU specified, modulation modes for establishing an initial connection. Thus, the two modems may establish communications with each other using a compatible modulation method. It is across this connection that the incompatible modulation method may be transferred from one modem to another. As such, once the transfer of the modulation method is completed, each modem will then have the same modulation method. This alleviates any modulation method incompatibility problems since each modem now has the same modulation method as the other. Thus, an important aspect of the invention relates to enabling modems having generally incompatible modulation methods to communicate with one another using one of the incompatible modulation methods.

Another important aspect of the invention relates to the adaptive modulation system determining whether the exchange of the modulation method is time efficient. In particular, the present invention compares the duration of data transfer operations in regards to any communications functions the PC is conducting with the duration of transferring the modulation method algorithm from one modem to another. Thus, download of the algorithm is prevented in those instances where it would take longer to download the algorithm than to complete the communications functions.

Figure 1:
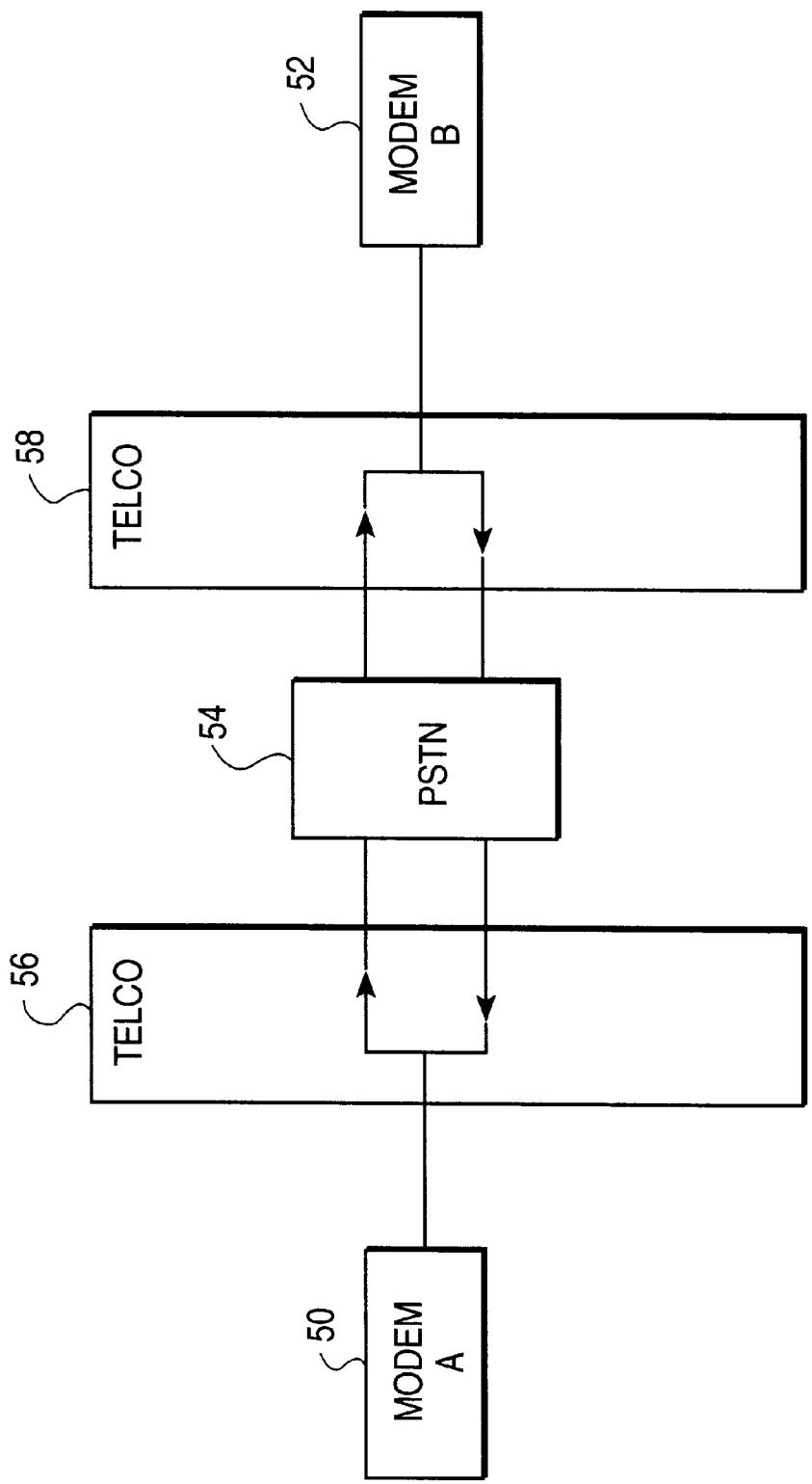
FIG. 1 is a block diagram of a known modem based communication system.

Referring to FIG. 1, a known communications system is shown wherein a local modem and a remote modem are in communication. Traditional hardware based modems are designed to convert computer produced digital data into the analog format necessary for transmission across the PSTN. It should be noted that the present invention is applicable to digital and analog modems as well as the communications devices. Furthermore, the present invention is also applicable to software based modems, commonly referred to as controllerless and software modems.

In particular, the local modem A 50 communicates with the remote modem B 52 via the public switched telephone network (PSTN) 54. For example, the modem A 50, which may be located at the subscribers premises, and the modem B 52, which may be located at the online service provider (OSP) location, access the PSTN 54 through their respective telephone companies 56, 58. The modems 50, 52 may be connected to personal computers and/or servers (not shown) which may, for example, instruct the modem A 50 to dial a telephone number associated with the modem B 52 or network the user is attempting to access. As described above, after dialing and detecting an answer tone from the remote modem B 52 of the facility being dialed, both the local modem A 50 and the remote modem B 52 perform a handshaking and training procedure to establish the data connection. The modems are then able to exchange data as necessary.

Figure 2:
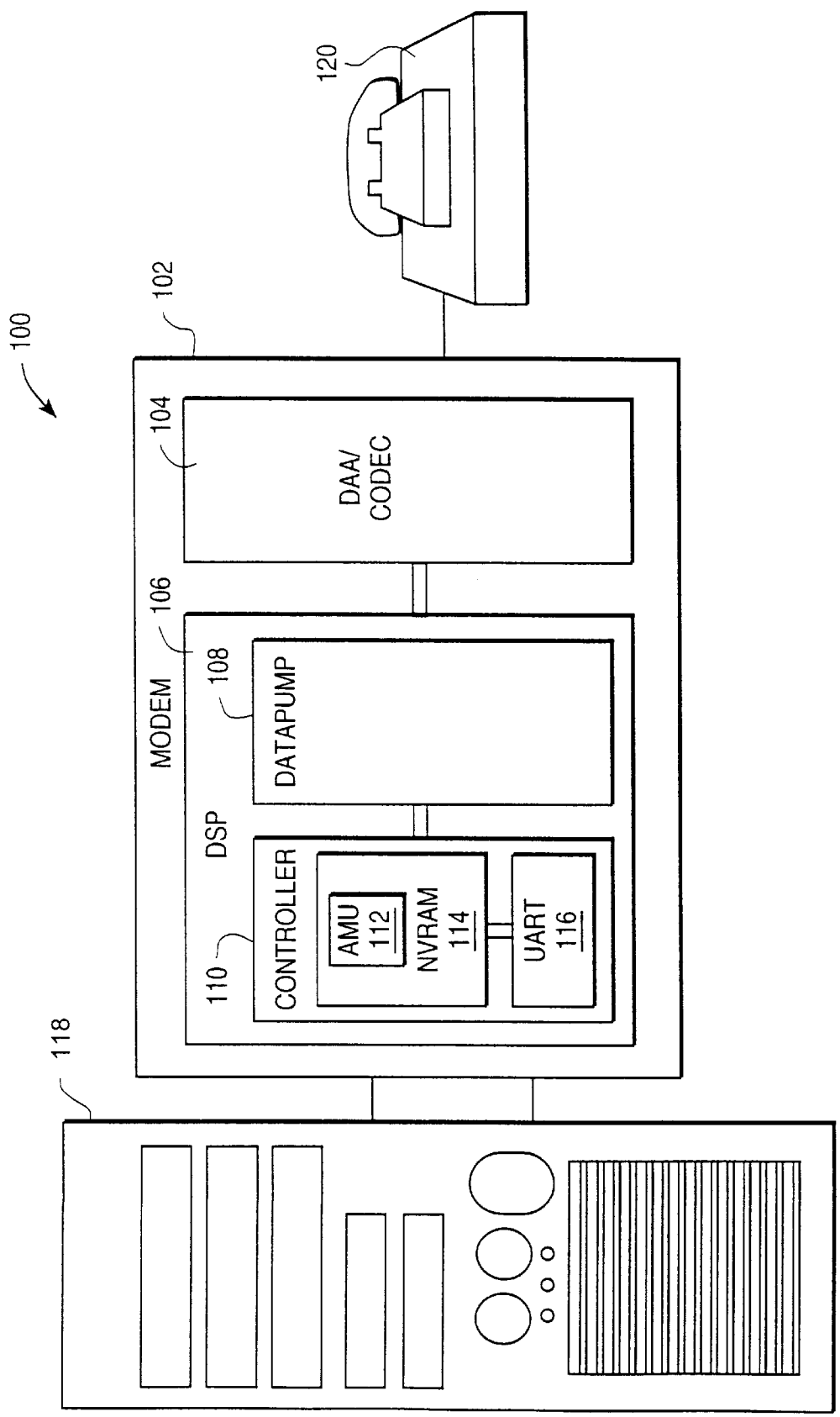
FIG. 2 is a block diagram of the adaptive modulation system in accordance with the present invention.

Referring to FIG. 2, an exemplary embodiment of the adaptive modulation system in accordance with the present invention, generally identified with the reference 100, is illustrated. By way of example only, the adaptive modulation system 100 is shown as being implemented in a modem 102 connected to a PC 118 and attached to the PSTN through a telephone connection 120. The modem 102 generally includes a data access arrangement/coder/decoder (DAA/CODEC) 104 to interface the modem 102 to the PSTN, a data pump 108 to provide signal modulation, a controller 110 to interpret the commands that initialize and control the modem's 102 internal settings and an universal asynchronous receiver/transmitter (UART) 116 to interface the modem 102 to the computer 118. The controller 110 contains the adaptive modulation unit (AMU) 112 which embodies the present invention, and is further described below.

In particular, the DAA/CODEC 104 provides the interface between the digital components of the modem and the analog telephone line. The CODEC converts the digital signal into analog format. The DAA tunes and balances the resulting analog signal to meet the requirements of the PSTN. It should be noted that the DAA characteristics can be changed to make the modem 102 compatible with various signalling and voltage level requirements for public telephone networks worldwide.

The data pump 108, which may be any general type of microprocessor, such as an Intel 80186 running at 25 MHz, provides signal modulation at different transmission rates and transmission types, such as V.34+ modulation and V.34 modulation to comply with PSTN standards. For high speed modem operation, the data pump 108 must include a sufficiently powerful microprocessor operating at sufficiently fast clock speeds in order to execute the required modulation methods.

The modem controller 110, which is standard in most modem designs, is programmed to interpret standard commands, such as the industry standard Hayes compatible AT command set, to initialize and control the modem's 102 internal settings. The modem controller 110 usually includes non-volatile random access memory (NVRAM) and/or a flash RAM 114, to store default settings for the modem 102, which may be set using the AT command set. It is to be noted that in many modern modem designs, the functions of the modem controller 110 and the data pump 108 are built in to a single high speed digital signal processor (DSP) chip 106. This results in a reduction of the number of components used in modem design and a corresponding decrease in price.

The UART 116 is a serial, asynchronous interface between the modem 102 and the computer 118. If the modem 102 is an internal model, the UART 116 is typically located in the controller 110 of the modem 102. On external modems, the computer's 118 serial communications port generally provides the UART function.

Figure 3:
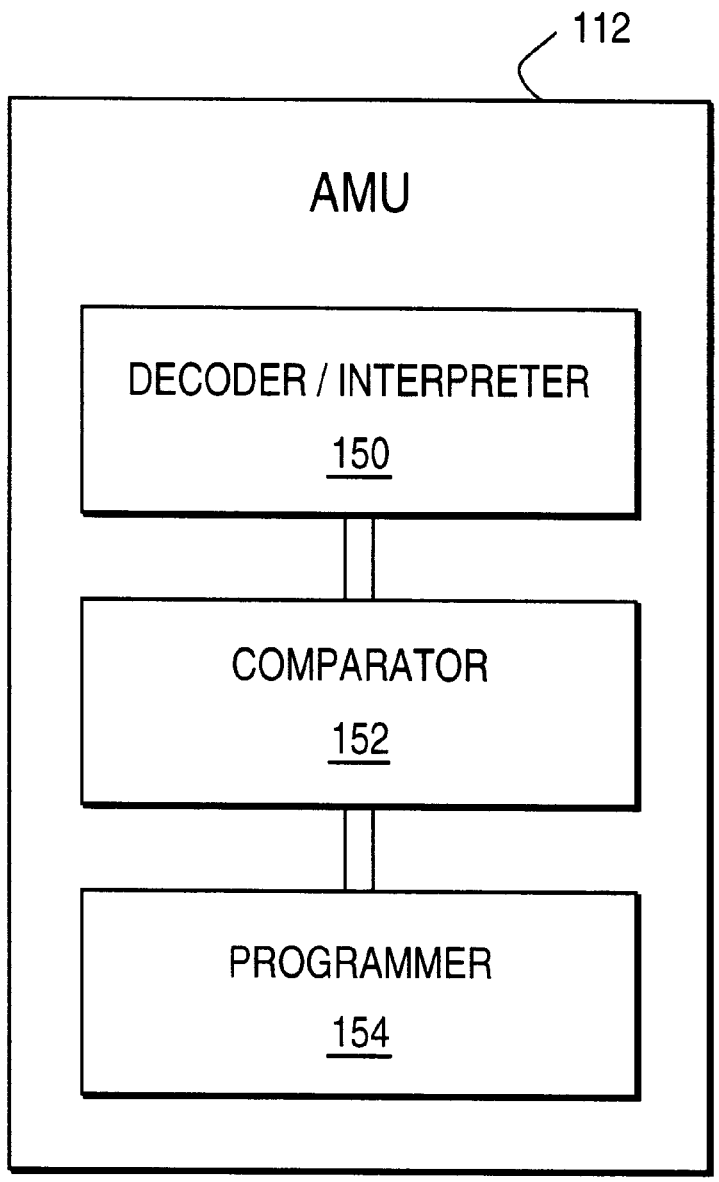
FIG. 3. is a block diagram of the adaptive modulation unit in the adaptive modulation system in accordance with the present invention.

Referring to FIG. 3, the AMU 112, which may be stored in a portion of the NVRAM 114, is used to enable modems having incompatible modulation methods to communicate with each other. For example, the present invention would enable a first X2 modem to learn the K56Flex technology from a second modem and communicate with that modem for the duration of the call. Such communication is accomplished by enabling one of the modems to download the modulation method from the other modem into its memory and begin modulation using the newly downloaded modulation algorithm, thereby eliminating problems associated with incompatible code. The AMU 112, in a particular embodiment of the present invention, includes a decoder/interpreter 150 to decode and interpret modulation methods, a comparator 152 for comparing communications data download size against modulation algorithm size and a flash RAM/NVRAM programmer 154 for programming the flash RAM with the modulation method algorithm.

In particular, a particular function of the decoder/interpreter 150 includes each modem querying and/or receiving information from the other modem as to each modem's highest possible communication speed and processing power requirement to run the modulation algorithm. The communication speed information may be in the form of data transfer speed, e.g. 56,000 bps and the processing power requirement information may be in the form of DSP power, such as units of millions of instructions per second (MIPS) or any other commonly known measure of processing power. Based on the above information, the decoder/interpreter 150 in each modem is able to determine which modem has the better algorithm. It should be noted that if the determination of which algorithm is better cannot be performed, or if both algorithms are equal in efficiency, then the calling modem's algorithm may be used.

The decoder/interpreter 150 in the modem having the better algorithm sends the other modem its algorithm. It should be noted that the algorithm may be in, for example, DSP microcode or any other type of computer program desired. A cross platform approach, such as a JAVA applet, may be preferred for its ease of use, however. In particular, JAVA requires no particular operating system or processor specific instructions and thus enables the modulation algorithm to be transferred between modems having generally non-compatible DSPs. If other programming languages are used for the algorithm, then language compatibility issues must first be resolved.

The decoder/comparator 150 of the receiving modem receives the algorithm and decodes the instructions. Upon decoding the algorithm instructions, the programmer 154 programs a portion of the NVRAM 114 with the newly downloaded modulation algorithm. Upon retraining the receiving modem jumps to the portion of the NVRAM 114 containing the downloaded algorithm and begins executing the new algorithm. Both modems may then communicate at the higher modulation speed using the transferred modulation method. It is to be noted that the system may optionally be configured to enable or disable certain, or all, features of the algorithm download procedure. For example, the system may be configured such that an algorithm sent by one communications device may be kept permanently by the receiving device. This may be an option in those cases where the algorithm is in the public domain and not subject to licensing requirements, etc. The receiving device, at its option, may decide to keep or discard the algorithm.

The system may also be configured such that any algorithm that is transferred must be flushed from the NVRAM 114 of the receiving modem once the communications session is concluded. This would prevent users from retaining any copying protected algorithms and from distributing them to any unlicensed sites.

In another configuration, the system may prevent any type of algorithm transfer at all. As such, manufacturers would have the ability to disallow, for example, proprietary code from being transferred from one device to another.

Thus, it can be seen that the flexibility of the present invention enables the exchange of algorithms solely at the manufacturer's discretion, thereby assuming that only those users who are authorized to communicate at higher speeds may do so.

Optionally, the AMU 112 may include a comparator 152 for efficiency determination. In particular, the comparator 152 enables the modems to determine whether exchanging algorithms is efficient in light of the current communications functions being performed by the system. Efficiency is determined by the comparator 152 comparing the size and/or download requirement times of the modulation algorithm with the size and/or download time, e.g. session duration, of the particular data being transferred during the communications function being performed.

In particular, the data terminal equipment (DTE) and the data communications equipment (DCE), e.g. PC and modem, may communicate with each other before the modulation algorithm is exchanged. During that time, the modem could query the PC for an estimate of the size and/or duration of the data transfer in either data bits to be exchanged or the time required to transmit the data. The PC could then respond with a number indicating the duration of the contemplated communications action, such as 500 Kb and/or ten minutes. These values could be saved in a register in the NVRAM 114 for later comparison. The local and remote modems would then exchange information regarding the size and/or download time required of the modulation algorithm, which could also be saved in a register. The comparator 152 would then compare the contents of each of the registers to determine whether downloading the algorithm would result in a significant time savings.

For example, if the PC user is in a browser session, it can be expected that the user will take at least a minute and visit more than a single web page. Thus, some estimation of the average duration can be passed to the modem. Based on the duration information and the download algorithm information, the modem may recognize, for instance, that it is worth downloading new code that allows 56 Kbps modulation. However, if the PC is engaged in, for example, bank transaction through a personal finance program, the session may only last seconds. Accordingly, connection at a lower speed would likely be more efficient than establishing a connection, attempting to transfer the algorithm and then optimizing to the higher speed. As such, situations wherein the time required to download the algorithm exceeds the time within which the modem could have completed the connection at the lower speed are prevented. Furthermore, in a particular embodiment of the invention, algorithm transfer may be limited to take place either before the session between the modems start, or during "blank" periods when other information is not passing from one modem to another. These techniques eliminate or reduce excess bandwidth consumption that could appear to slow down the user's connection.

Figure 4A:
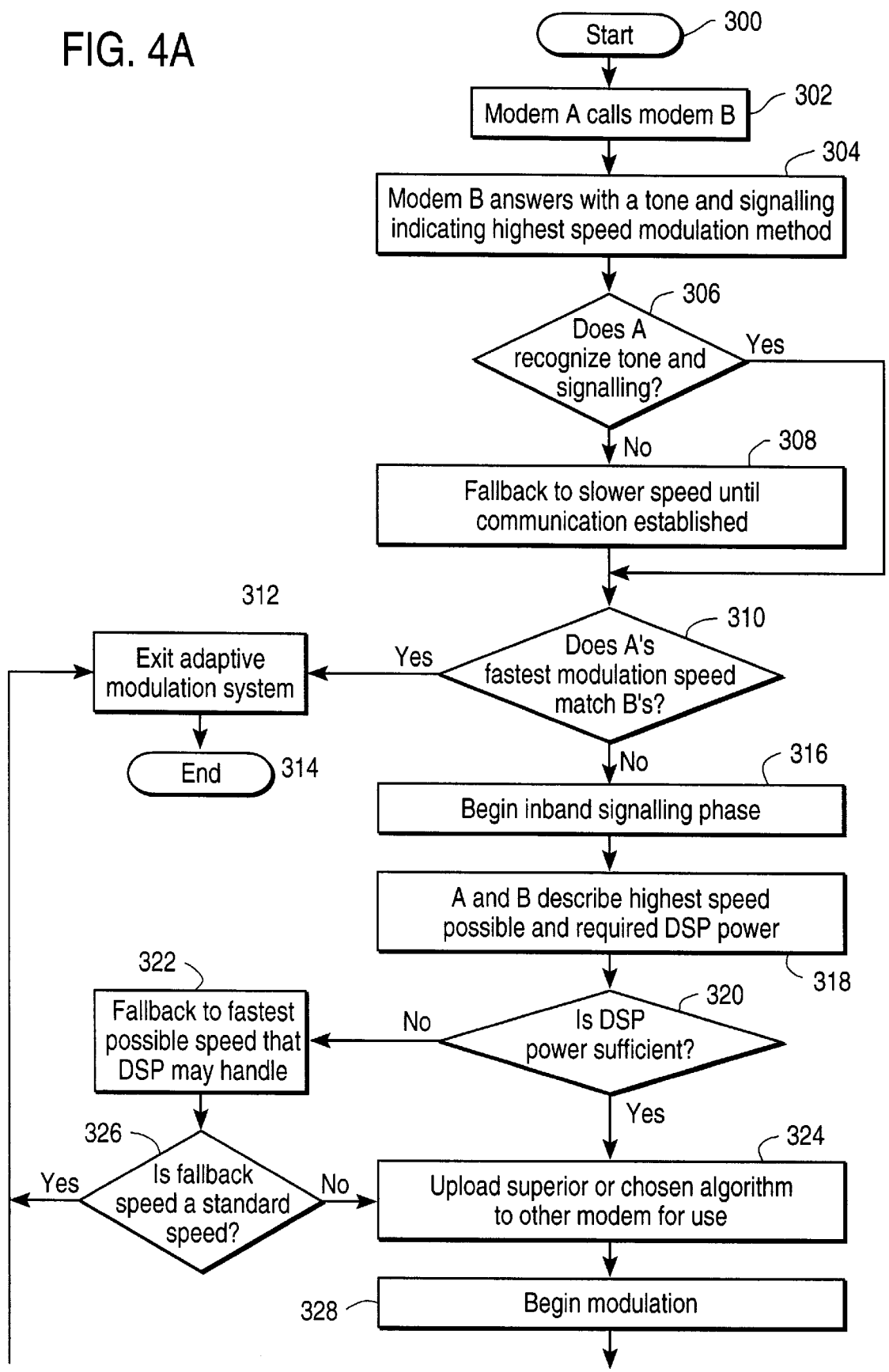
FIGS. 4A and 4B taken together are a flow diagram of the adaptive modulation system in operation in accordance with the present invention.
Figure 4B:
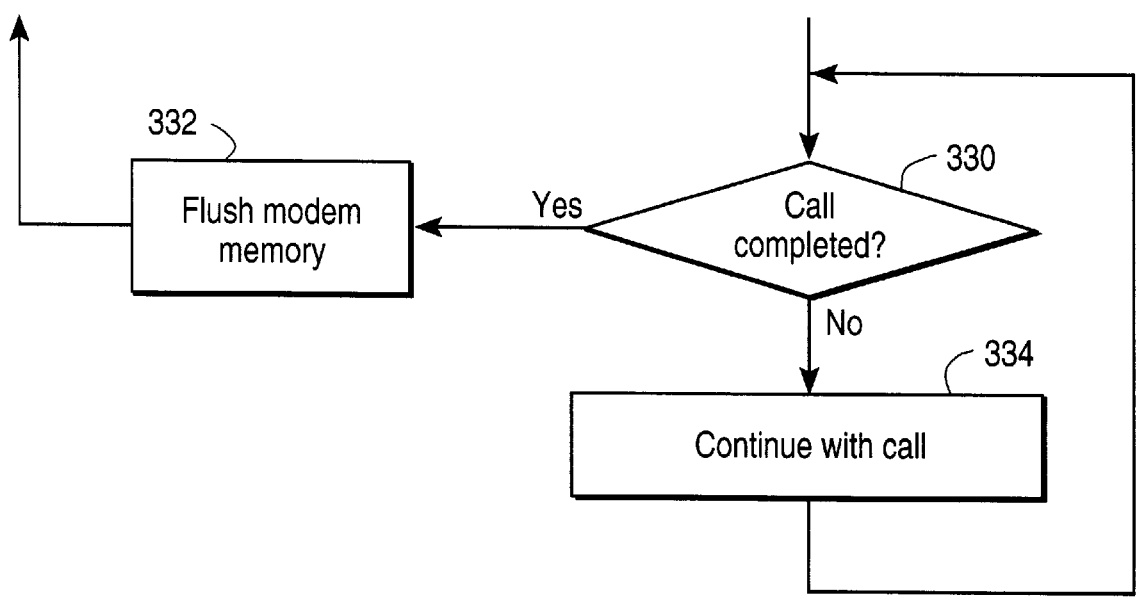

Referring to FIGS. 4A and 4B, the adaptive modulation system is shown in operation. In particular, in step 302, the local modem, for example, modem A, initiates a call to the remote modem, modem B. Modem B, in step 304, answers with the tone and signal indicating the highest speed modulation mode at which it may operate. In step 306, modem A determines whether it recognizes the tone and signalling sent by modem B. If modem A does not recognize the tone and signalling, then in step 308, modem B will fall back to a slower speed until the communication may be established with modem A, generally at an ITU specified mode. However, if modem A does recognize the tone and signalling, then a communication link is established at that point. In either case, in step 310, the system determines whether modem A's mode for establishing the fastest modulation speed matches that of modem B's. If there is a match, then in step 312, the system will exit the adaptive modulation program, since both modems are able to connect at the higher speed. This may occur when both modems, for example, are using X2 modulation. However, if the modulation speeds do not match, which may occur, for example, if one modem is using K56Flex and the other is using x2, then in step 316, the modems will begin an inband signalling phase.

In step 318, modem A and modem B will describe to each other the highest speed possible at which they may operate and the required DSP power to operate under such speeds. In step 320, each modem determines if there is sufficient DSP power to operate at the highest possible speed. If sufficient DSP power is not available, then the modems will fall back to the fastest possible speed that the DSP is able to handle. In step 326, the system determines whether the fall back speed is a standard speed. If it is determined that the fall back speed is standard, then the system will exit the adaptive modulation system in step 312. However, if the fall back speed is not a standard speed and the DSP power is sufficient, then in step 324, the modem containing the superior or chosen algorithm will transmit the algorithm or modulation method to the other modem. In step 328, the modems will begin modulation at the newly downloaded algorithm data rate.

In step 330, the system determines whether the call was completed. If the call was not completed, the system in step 334 returns to step 330 to wait until the call is completed. Upon completion of the call, in step 332, the modem that received the new algorithm will flush its memory of the new modulation method and return to step 312 at which point the system will exit the adaptive modulation.

Figure 5:
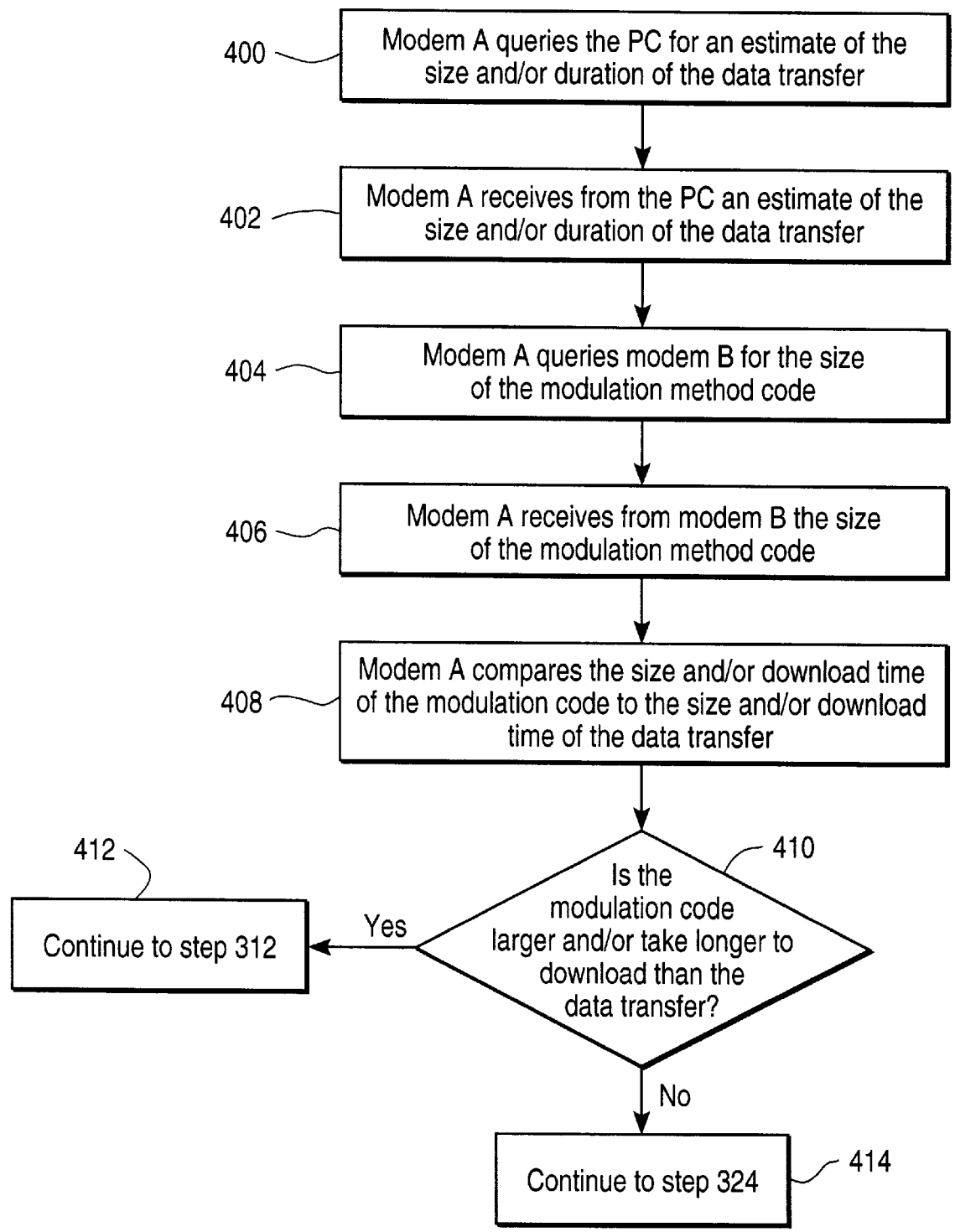
FIG. 5 is a flow diagram of an optional efficiency routine in accordance with the present invention.

Referring to FIG. 5, the optional efficiency determination steps in the adaptive modulation system are shown in operation. Efficiency determination may be performed after step 320 (FIG. 5). In particular, in step 400, modem A queries the PC for an estimate of the size and or duration of the data transfer of the communications function being performed by the PC and modem. In step 402, the modem receives the information. Modem A then queries modem B, in step 404, for the size and or download duration for the modulation algorithm and receives the information in step 406. In step 408, the comparator compares the size and/or download time of the modulation algorithm to the size and/or download time of the data transfer. In step 410, if it is determined that the modulation code is larger than the data transfer information or will take longer to download, then in step 412 the system will return to step 312 (FIG. 4A) and exit the adaptive modulation system. However, if the modulation code is smaller and/or takes a shorter amount of time to download than the data transfer, then in step 414 the system will continue to step 324 (FIG. 4A) and upload the superior algorithm.

What is claimed is:

1. An adaptive modulation system for communications devices, comprising:
    a first communications device having a first modulation unit for storing a first modulation algorithm, said first modulation algorithm including two or more modulation methods;
    a second communications device having a second modulation unit for storing a second modulation algorithm, said second algorithm including two or more modulation methods, said first modulation algorithm having at least one modulation method that is incompatible with said modulation methods of said second communications device and also having at least one modulation method that is compatible with at least one of said modulation methods of said second communications device; and
    an adaptive modulation unit for enabling said first and second devices to communicate with each other using one of said incompatible modulation methods.

2. The adaptive modulation system of claim 1, wherein said adaptive modulation unit determines which of said communications devices has a better modulation method.

3. The adaptive modulation system of claim 2, wherein said adaptive modulation unit enables said better modulation method algorithm to be sent from one said communications device to the other said communications device.

4. The adaptive modulation system of claim 2, wherein said communications devices are modems.

5. The adaptive modulation system of claim 1, wherein said adaptive modulation unit further includes means for requesting session duration time between said communications devices.

6. The adaptive modulation system of claim 1, wherein said adaptive modulation unit further includes means for requesting session size between said communications devices.

7. The adaptive modulation system of claim 1, wherein said adaptive modulation unit further includes means for providing session duration time between said communications devices.

8. The adaptive modulation system of claim 1, wherein said adaptive modulation unit further includes means for providing session size between said communications devices.

9. The adaptive modulation system of claim 8, further including a comparator for determining whether said incompatible algorithm is smaller in size than said session.

10. The adaptive modulation system of claim 7, further including a comparator for determining whether said incompatible algorithm is smaller in duration than said session duration.

11. The adaptive modulation system of claim 2, further including means responsive to said comparator for determining whether said better modulation method algorithm should to be sent from one said communications device to the other said communications device.

12. In an adaptive modulation system, a method for enabling communications devices having incompatible modulation methods to communicate, comprising:

provided a first communications device having a plurality of modulation modes;

providing a second communications device having a plurality of modulation modes wherein at least one of said plurality of modulations modes is incompatible with at least one of said plurality of modulation modes in said first communications device and at least one of said plurality of modulations modes in said second communications device is compatible with one of said plurality of modulation modes in said first communications device;

establishing a connection between said communications devices using one of said compatible modulation modes;

transferring one or more said incompatible modulation modes from said first communications device to said second communications device; and establishing modulation between said communications devices using said incompatible modulation mode.

13. The method of claim 12, further including the step of determining the efficiency of said transferring step.

14. The method of claim 12, further including means for preventing said transferring step in response to said efficiency determining step determining that transfer of said modulation modes is not efficient.

15. The method of claim 12, further including the step of requesting session duration time between said communications devices.

16. The method of claim 12, further including the step of requesting session size between said communications devices.

17. The method of claim 15, further including the step of providing session duration time between said communications devices.

18. The method of claim 16, further including the step of providing session size between said communications devices.

19. The method of claim 16, further including the step of determining whether said incompatible modulation mode is embodied by an algorithm of smaller in size than said session.

20. The method of claim 15, further including the step of determining whether said incompatible modulation mode is embodied by an algorithm of smaller in duration than said session duration.

21. The method of claim 12, further including the step of determining whether a better modulation method algorithm should to be sent from one said communications device to the other said communications device.

22. An adaptive modulation system for communications devices, comprising:

a first communications device having one or more modulation standards;

a second communications device having one or more modulation modes wherein at least one of said modulations modes is incompatible with said first communications device; and an adaptive modulation unit for enabling said first communications devices to recognize and utilize said incompatible modulation mode to enable said first communications device to communicate with said second communications device using said incompatible modulation mode.

* * * * *